Figure 1:
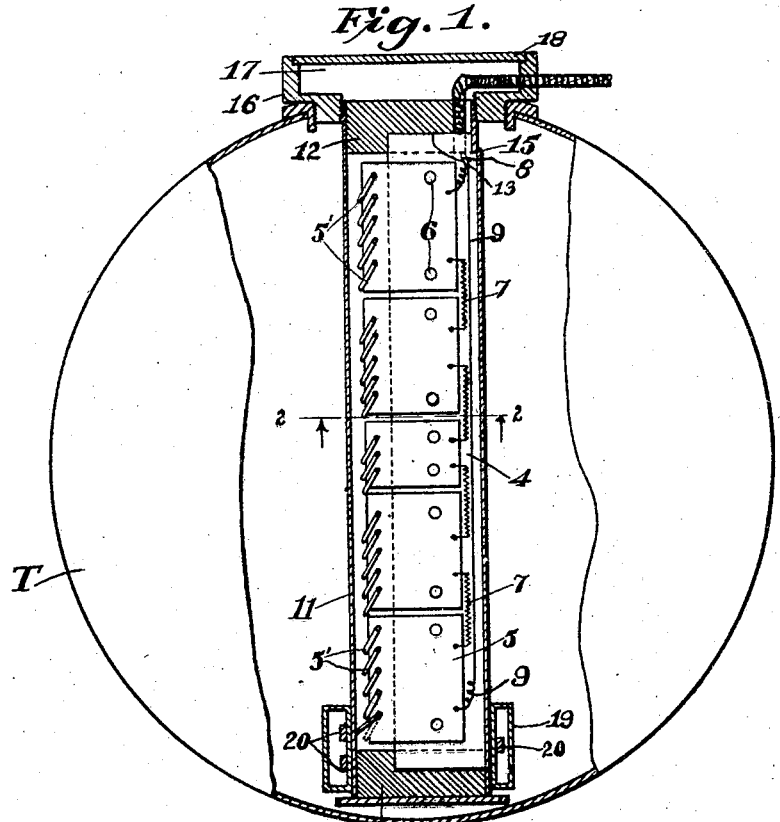

Aug. 21, 1928. 1,681,268

L. R. TITCOMB

FLOAT OPERATED RHEOSTAT

Filed Feb. 7, 1925

Inventor
Lee R. Titcomb.
By his Attorney John O. Seifert

Patented Aug. 21, 1928.

1,681,268

UNITED STATES PATENT OFFICE.

LEE R. TITCOMB, OF BROOKLYN, NEW YORK, ASSIGNOR TO AUTO-METER CO. INC., OF NEW YORK, N. Y., A CORPORATION OF DELAWARE.

FLOAT-OPERATED RHEOSTAT.

Application filed February 7, 1925. Serial No. 7,478.

This invention relates to electric current flow regulating means or rheostat particularly adapted for use in connection with electric indicating means, wherein an indicator is moved under the influence of opposed magnetic forces induced by the current flow and varied by and in accordance with variations in the strength of the current flow to indicate the quantity of liquid in a tank by introducing or cutting out predetermined amounts of resistance from the circuit of the magnetic force generating means, and it is the object of the present invention to provide an improved float operated rheostat or current flow regulating means to introduce into or cut out of the magnetic force generating means of an indicating instrument predetermined amounts of resistance, and to provide means of this character which is simple and compact in structure and efficient in use, and adapted to be inserted into a liquid carrying tank and controlled by the quantity of liquid in the tank to thereby influence the indicating instrument to indicate the quantity of liquid in the tank.

As stated, the indicating instrument to indicate the quantity of liquid in a tank is controlled by introducing into and cutting out predetermined amounts of electric resistance in circuit with the instrument, this resistance means usually comprising a coil constituting a part of the rheostat and extending longitudinally thereof, different amounts or portions of the resistance coil being introduced into the circuit by magnetic contact means one member of which, such as a magnet, is carried by a float which rises and falls with the liquid level in the tank, and such contact means introducing and cutting out different amounts of predetermined and the same extent of the resistance. In the use of such a device in tanks of circular form in cross section when the tank is supported with the longitudinal axis in a horizontal plane the cross sectional area of the tank varies in accordance with the curvature of the wall of the tank with the result that the bottom portion of the tank has a less cubical area for a given height than the next adjacent portion of the tank of the same height and this increases toward the center of the tank and decreases from the center to the top of the tank in the same proportion to the increase from the bottom to the center. It is, therefore, obvious that in the use of a rheostat device wherein portions thereof of the same extent are introduced into and cut out from the circuit there can be no true and accurate determination of the quantity of liquid in the tank, and it is a further object of the invention to provide a rheostat or electric current flow regulating means of this character which is particularly adapted for use in connection with liquid carrying tanks of circular shape in cross section wherein the rheostat is suspended in the tank to extend transversely of the tank with the tank supported with its longitudinal axis extending in a horizontal plane, and to the construction and arrangement of the rheostat whereby to control the indicating instrument to give a correct and accurate reading of the quantity of liquid in the tank by the varying liquid level therein.

In the drawing accompanying and forming a part of this specification Figure 1 is a longitudinal sectional view of rheostat device illustrating an embodiment of my invention and showing the same arranged in a tank of circular shape in cross section.

Figure 2:
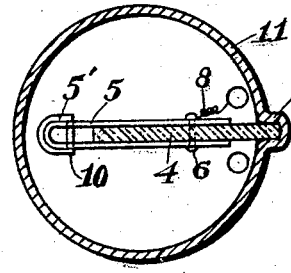
Figure 3:
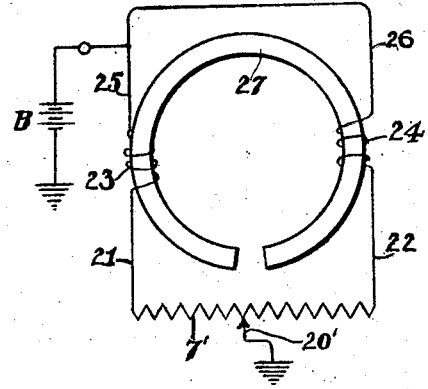

Figure 2 is a cross sectional view, taken on the line 2—2 of Figure 1 looking in the direction of the arrows; and Figure 3 is a diagrammatic view of an electric hook up of the rheostat device with an indicating instrument.

In carrying out the embodiment of the invention illustrated in the drawing I provide a flat bar 4 of insulating material and mount thereon plates 5 of conducting material to extend longitudinally thereof in spaced and insulated relation, there being five of these plates shown in the present instance although a greater number may be utilized. These plates are of U-shape in cross section and are engaged upon the insulator bar to straddle and embrace a longitudinal marginal edge portion of the bar with the bend of the plates offset in spaced relation to the edge of the bar and the free ends located within the opposite edge portion of the bar. The plates are secured to the bar in a suitable manner, as by rivets 6, and are of different lengths with the plate of least length arranged midway between the ends of the bar and the plates at opposite ends of said plate progressively increasing in lengths to the ends of the bar.

The plates are electrically connected to different portions of the electric current resistance element, shown as comprising a series of coils 7, there being four of these coils shown in the present instance, with the terminals of the coils electrically connected to adjacent conducting plates 5 whereby the coils are connected in circuit with said plates, the coils being connected in an electric circuit through the plates by conductors 8 and 9 connected to the plates at the opposite ends of the bar.

Each of the conductor plates 5 movably carries a series of contacts 5' in electrical connection therewith, said contacts preferably being arranged in equidistant spaced relation. These contacts comprise U-shaped members of magnetizable material having the ends bent inward for engagement in perforations in opposite walls of the conductor plates adjacent the bend, as at 10 (Figure 2) whereby said contacts will engage about the bend of the plates and normally assume a position by gravity with the conducting portion in engagement with the conductor plates as shown in Figure 1.

The insulator bar 4 with the contact carrying conductor plates 5 and resistance coils 7 are mounted in a tube 11 of current conducting but non-magnetizable material, such as brass, by heads 12 of insulator material which serve to substantially close the ends of the tubular housing 11, the ends of the bar being engaged in recesses in said heads, as at 13, the upper head being provided with perforations 12 for the passage of terminal conductors 8, 9 of the coils and conductor plates. The tube 11 is arranged with a laterally offset portion 15 to form a recess extending longitudinally of the tube in which the edge portion of the insulator bar opposite to the contact carrying conductor plates is arranged to hold said bar in fixed position with the contacts 5 in predetermined relation to the wall of the tube 11, and for a further purpose to be hereinafter described.

The tubular housing 11 also serves as a means to mount the current flow regulating means in an opening in the side of the tank T of circular shape in cross section to be suspended therein to extend transversely of the tank, or from the top to the bottom of the tank. The mounting for the tube comprises a closure 16 for an opening in the tank arranged to be removably engaged therein and in an opening in which closure the tube is secured. The closure has a recess 17 in the outer side closed by a plate 18 to serve as a chamber for the connection of leads to the terminal conductors of the resistance coils, which leads pass through a perforation in the wall of said recess.

The circuit is closed through either one of the contacts 5' to connect the carriers 5 for said contacts and different portions of the resistance element or coils in the circuit by moving one or more of the contacts 5' into engagement with the tubular housing 11, said housing serving as a contact common to all of the contacts 5'. For this purpose the tube 11 is connected by said contacts and their carriers and resistance coils with a suitable source of electricity, in motor vehicle practice to which the present invention is particularly adapted comprising a storage battery when one terminal of the battery is grounded as well as the tube 11, as in the vehicle frame.

As stated the present invention is adapted for use in connection with indicating instruments to ascertain the quantity of liquid in a tank, such as a gasolene storage tank of a motor vehicle and represented at T, the indicating instrument being controlled by introducing or cutting out more or less of the resistance from the magnetic force generating means of the indicating instrument by and in accordance with the liquid level in the tank. For this purpose a float 19 is mounted upon the tube 11 to have movement along the same with the rise and fall of the liquid level in the tank, the downward movement of the float being limited by a flange on the end of the closure 12 of the tube. This float is shown as of the hollow metallic type. The core of the float has a laterally recessed portion for the engagement of the offset portion 15 of the tube and whereby the float will be guided in its up and down movement on the tube. The contacts 5' are moved into engagement with the tube 11 to close the circuit through the magnetic force of a permanent magnet 29 mounted upon the core and within the float, this magnet being of the split ring type the split ends or the pole pieces being offset longitudinally of the float core as shown in Figure 1 and arranged so that said offset ends of the magnet will come opposite to the contacts 5'.

In Figure 3 I have illustrated in a diagrammatic manner the electrical hook up of my improved rheostat or current flow regulating means, indicated at 7', and the magnet indicated in a diagrammatic manner at 20', the regulating means being connected by leads 21, 22 with one terminal of coils 23, 24 the opposite terminals 25, 26 of the coils being connected with a storage battery, shown in a conventional manner at B, the battery and contact maker 25' when the invention is used in connection with motor vehicle practice being grounded on the vehicle frame, as shown in a conventional manner. The coils 23, 24 are arranged to generate opposed magnetic forces which are adapted to act on a ring 27 of magnetizable or polarized material to move said ring in a circular path, the ring forming a part of or carrying the indicator of the indicating instrument. By this arrangement as a portion of the resistance 7' is cut out of one coil 23, a proportional amount will be connected into the other coil 24, thereby proportionally increasing and decreasing the values of the magnetic forces generated by the coils and thereby influencing the indicator ring 27 to move the same. In some instances the one coil, as 24, may be connected directly with the source of electricity whereby the value of the magnetic force generated by said coil will be constant. In this arrangement the one terminal of the resistance 7' is grounded and the other terminal connected to the coil 23, whereby the value of the magnetic force generated by said coil will be variable relative to the value of the force generated by coil 24 and thereby controlling the movement of the indicator ring 27.

In a tank of circular shape in cross section when supported in position with the axis of the tank in a horizontal plane, the cross sectional area of the tank varies due to the curvature of the wall of the tank with the result that the lower portion of the tank has a less cubical area for a given height than the next adjacent portion of the tank for the same height, and this progressively increases toward the center of the tank and progressively decreases in the same proportion from the center to the top of the tank. To compensate for this variation in area of the tank the contact carrying plates 5 are made of different lengths with the central plate of less length and the plates at opposite ends of progressively increasing lengths with the plates of greatest length at the top and bottom of the tank. By this arrangement when the float is in position so that the magnet carried thereby will attract either one of the contacts of the lowermost contact carrying plate toward the tube 11 all of the resistance will be connected into the one coil, say 23, of the instrument and influencing the instrument to indicate that the tank is filled to one quart or less of its capacity. When the circuit is closed through the contacts of the conductor plate 5 next to the lowermost plate a portion of the resistance will be cut out of the coil 23 and a proportional amount connected into the coil 24 thereby influencing the instrument to indicate that the tank is more than one-quarter full but less than one-half full. When the circuit is closed through the middle or shortest conductor plate substantially an equal amount of the resistance will be connected into each of the coils 23, 24 of the indicating instrument and will influence the instrument to indicate that the tank is one-half full. As the circuit is closed through the two uppermost plates 5 a progressively increasing amount of the coil 23 will be cut out of said coil and a proportional amount of the resistance connected into the coil 24 thereby influencing the instrument to indicate that the tank is either three-quarters full or filled to its capacity.

Having thus described my invention, I claim:

1. In electric current regulating means, electric resistance means arranged for connection in an electric circuit, a series of conducting members arranged in alined and insulated relation and each member connected to different portions of the resistance means, said members being of different length with the central member of less length and the successive conducting members at opposite ends of said central member progressively increasing in length and through one of which members the resistance member is adapted to be connected in the circuit.

2. In electric current regulating means, electric resistance means arranged for connection in an electric circuit, a series of conducting members arranged in alined and insulated relation and each member connected to different portions of the resistance means, said members being of different length with central member of less length and the successive conducting members at opposite ends of said central member progressively increasing in length, a plurality of contacts carried by each conducting member, and a contact member common to all of the contacts of the conducting members and through either one of which contacts and the common contact the electric circuit through different portions of the resistance means is adapted to be established.

3. In electric current flow regulating means, a bar of insulator material, current resistance means carried by said bar arranged for connection in an electric circuit, members of conducting material mounted on said bar to extend longitudinally thereof, said members being insulated from each other and electrically connected with different portions of the resistance means, and said conducting members being of different lengths with the central member midway between the ends of the insulator bar being the shortest, and the members at opposite ends of said central member progressively increasing in length to the opposite ends of the bar, and means to close the circuit through either one of said conducting member and different portions of the resistance means.

4. In electric current flow regulating means, electric current resistance means arranged for connection in an electric circuit, an insulator bar, a series of plates of conducting material mounted on said bar in insulated and spaced relation and connected in circuit with different portions of the resistance means, said plates being of variable lengths with the central plate midway between the ends of the bar being the shortest and the plates progressively increasing in length to the opposite end of the bar at opposite ends of said central plate, contacts of magnetizable material movably carried by said plates, and a tube of conducting and non-magnetizable material connected in the circuit of the resistance means in which the bar with the plate carrying contacts and resistance means is mounted, said tube serving as a contact member common to all of the plate contacts and through which tube and the plate contacts the electric circuit is adapted to be established through different portions of the resistance means.

5. Electric current regulating means in accordance with claim 4 wherein the circuit is established through plates and the tube by a magnet movable along the tube and adapted to attract the plate contacts to the tube.

6. Electric current regulating means in accordance with claim 4 wherein the tube in which the member with the plate carrying contacts and resistance means is mounted is adapted to be mounted in a liquid carrying tank, magnet, and a float by which the magnet is carried movable along the tube adapted to position the magnet at variable points along the tube by and in accordance with the liquid level in the tank.

7. In electric current flow regulating means, a flat bar of insulator material, a series of U-shaped plates of conducting material mounted in straddling relation along one edge of the bar with the connecting portion of the plates offset from the bar and arranged for connection in an electric circuit, U-shaped contacts of magnetizable material pivotally carried by the plates to straddle the bend of the plates, a series of resistance coils electrically connected to the plates in interposed relation thereto, a tube of non-magnetizable and conducting material in which the insulator bar with the contact carrying plates and coils is mounted and enclosed connected in the circuit of the plates and coils, a magnet adapted to attract the plate contacts to the tube to establish the circuit through different portions of the plates, and a float movable along the tube and carrying the magnet for the purpose specified.

Signed at the city of New York, in the county of New York and State of New York, this 29th day of January, 1925.

LEE R. TITCOMB.